United States Patent Office 3,830,809
Patented Aug. 20, 1974

---

3,830,809
BIS-DICYCLOHEXYLAMINE N-CARBISOBUTOXY-
CEPHALOSPORIN C
Thomas J. Brooks, Jr., Manlius, N.Y., assignor to
Bristol-Myers Company, New York, N.Y.
No Drawing. Filed Aug. 25, 1972, Ser. No. 283,887
Int. Cl. C07d 99/24
U.S. Cl. 260—243 C      1 Claim

ABSTRACT OF THE DISCLOSURE

After the reaction at the free amino group of cephalosporin C in a fermentation beer with isobutyl chloroformate followed by extraction into methyl isobutyl ketone at pH 2, the product is recovered in high yield as a substantially pure crystalline bis-amine salt by the addition of two moles of dicyclohexylamine.

BACKGROUND OF THE INVENTION

(1) Field of the Invention

This invention relates to a certain new salt and process for its use in an improved process for the production of 7-amino-cephalosporanic acid (7-ACA) from cephalosporin C produced by fermentation.

(2) Description of the Prior Art

U.S. Pat. 3,573,296 reviews the art and describes an improved process for the production of 7-ACA, the desirable "nucleus" of many semisynthetic cephalosporins, in which cephalosporin C in a fermentation beer is immediately reacted with isobutyl chloroformate to produce the compound of the formula

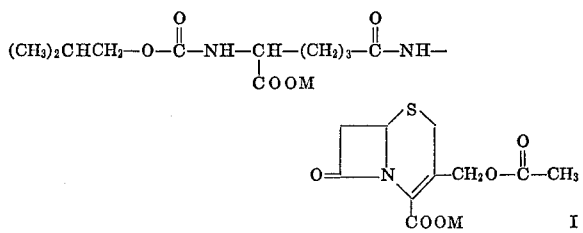

In the process of the patent (see Example 1), the beer containing this compound is adjusted to pH 2 (so that M is hydrogen) and the compound is extracted into methyl isobutyl ketone (MIBK). The MIBK phase is then treated with the strong base sodium 2-ethyl-hexanoate to precipitate the solid sodium salt of this compound (wherein M is sodium). The problem confronting the present inventor was the fact that this solid was less than 50% pure; the balance consisted of various acylated amino acids, etc. It was very difficult to process this highly impure material smoothly and efficiently to 7-ACA by the method of Example 2 of the patent.

SUMMARY OF THE INVENTION

This problem was solved by the provision, according to the present invention, of the bis-dicyclohexylamine salt of compound I, that is, each M represents a protonated molecule of dicyclohexylamine, having the formula

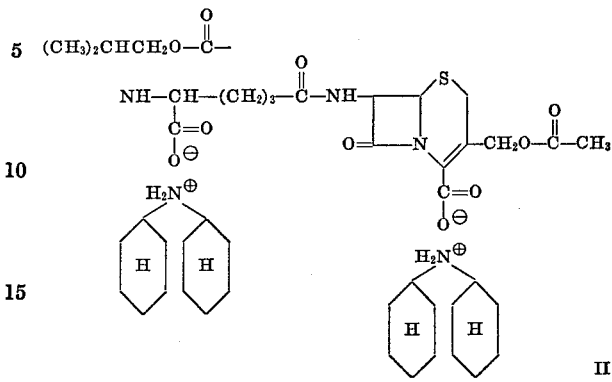

There is also provided by the present invention the process for obtaining substantially pure, solid compound II which comprises mixing dicyclohexylamine and an acidic, concentrated solution of compound I wherein M is hydrogen in a water-immiscible organic solvent, preferably MIBK, and then collecting the solid, crystalline product as by filtration. Use is made of at least two moles of dicyclohexylamine per mole of compound I; the concentration of compound I is ordinarily determined against a pure sample of itself and is expressed as potency in mcg./ml.

The following examples are given in illustration, but not in limitation, of the present invention.

DESCRIPTION OF THE PREFERRED EMBODIMENTS

Example 1

To 1000 ml. of methyl isobutyl ketone (MIBK) containing about 11,361 mcg./ml. of compound I (M is hydrogen), there was added 200 ml. water and 20 ml. dicyclohexylamine (free base). The mixture was stirred about two hours at room temperature. At the end of that time, the desired compound II had precipitated in substantially pure, crystalline form and was collected by filtration.

This product was successfully converted to 7-ACA by the method used on the sodium salt in Example 2 of U.S. Pat. 3,573,296. In one case, there was obtained a 75% yield of 7-ACA having a potency of 890 mcg./gm.

Example 2

Water (1200 ml.) was added to 3000 ml. of MIBK containing 7463 mcg./ml. of compound I (M is hydrogen) and there was then added dropwise 60 ml. dicyclohexylamine. After stirring crystals of compound II separated as a thick gelatinous mass which was collected by filtration and washed with MIBK and then acetone.

Volume MIBK mother liquor: 3000 ml.; potency 0 mcg./mgm.
Volume H$_2$O mother liquor: 1200 ml.; potency 413 mcg./mgm.
Weight of compound II recovered: 30.0 g.; potency mcg./mgm. (theory is 588)
Percent recovery: 74%

3

The calculated molecular weight of compound II is 876.64.

Example 3

To 500 ml. MIBK containing 7463 mcg./ml. of compound I (M is hydrogen) there was added 500 ml. fresh MIBK and 200 ml. water and then 10 ml. dicyclohexylamine. The mixture was stirred (a few hours) until compound II precipitated in crystalline form and was collected by filtration after standing overnight at ice temperature.

Weight recovered: 5.5 gm.; potency 658 mcg./mgm.
Percent recovered: 98%

Example 4

Water (800 ml.) was added to 15.5 l. MIBK containing 7463 mcg./ml. of compound I (M is hydrogen) and there was added dropwise 310 ml. dicyclohexylamine with stirring. Compound II crystallized to a thick mass (the crystals were gelatinous in nature and slow filtering) and was collected by filtration, washed with MIBK and acetone and then air dried.

Weight of compound II recovered: 247 g.; potency 470 mcg./mgm.
Volume mother liquor: 18,300 ml.; potency 470 mcg./ml.
Percent of compound I recovered as solid: 94%
Percent in mother liquor: 7%
Balance: 101%

4

I claim:
1. The compound having the formula

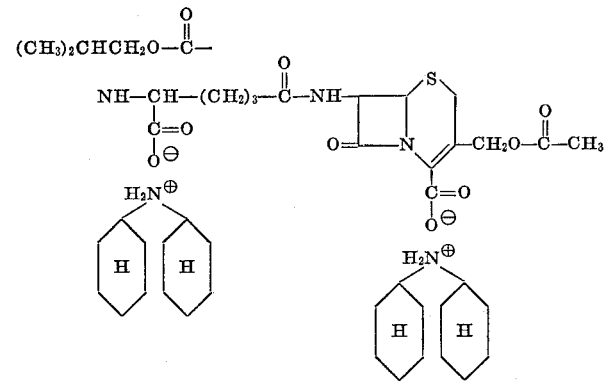

References Cited

UNITED STATES PATENTS

| 3,635,961 | 1/1972 | Butler | 260—243 C |
| 3,577,412 | 4/1971 | Jackson et al. | 260—243 C |
| 3,634,417 | 1/1972 | Attenburrow | 260—243 C |
| 3,634,416 | 1/1972 | Schofield | 260—243 C |

NICHOLAS S. RIZZO, Primary Examiner

D. E. WHEELER, Assistant Examiner

U.S. Cl. X.R.

424—246